May 6, 1930.  H. SCHLAICH  1,757,949
INDICATOR FOR DISTANCE TYPE THERMOMETERS
Original Filed Sept. 27, 1927
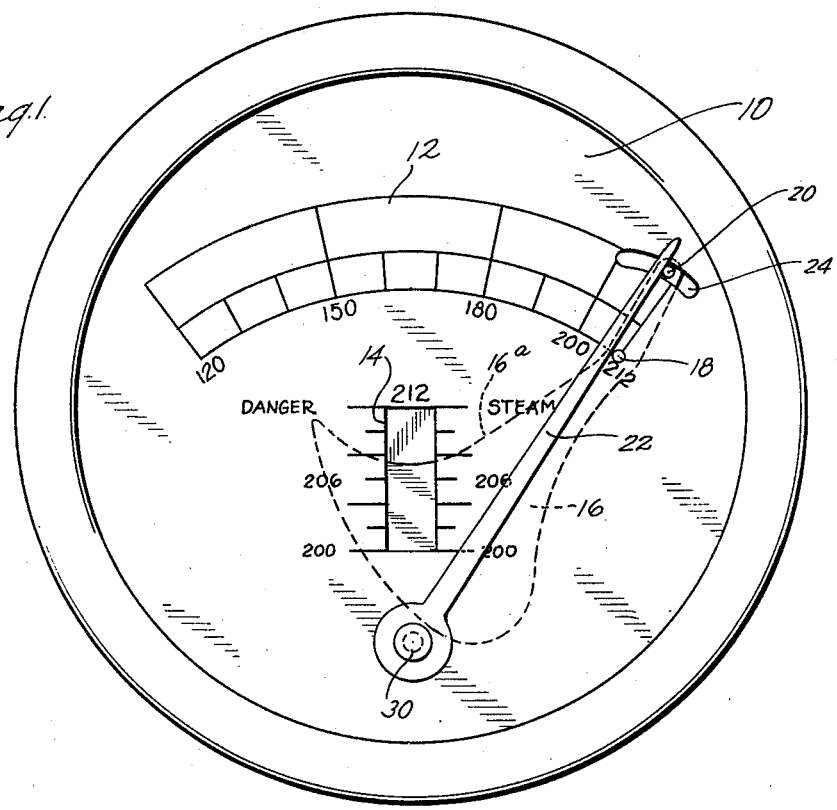
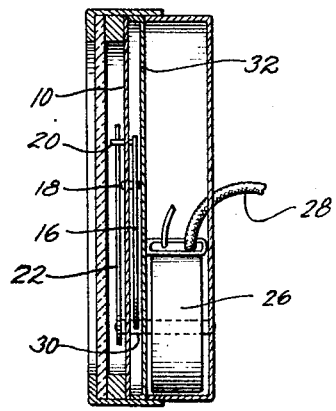
INVENTOR
HERMAN SCHLAICH
BY
Moser + Nolte
ATTORNEYS Patented May 6, 1930

1,757,949

UNITED STATES PATENT OFFICE

HERMAN SCHLAICH, OF FRANKFORT-ON-THE-MAIN, GERMANY

INDICATOR FOR DISTANCE-TYPE THERMOMETERS

Application filed September 27, 1927, Serial No. 222,383. Renewed November 19, 1929.

My invention relates to indicators which though susceptible to other uses, find particular application to distance type thermometers. My invention will be best understood from the following detailed description taken with the annexed drawing in which:

Figure 1 is an enlarged view of an illustrative embodiment, while

Figure 2 is a view on a reduced scale on a central vertical section through Figure 1.

In the embodiment illustrated, I have shown a main calibration and an auxiliary calibration which repeats on a magnified scale, a portion of the main calibration. In the case shown such portion of the main scale comprises the last several degrees thereof but so far as the invention is concerned any portion of the main scale may be magnified. Preferably and as shown, the auxiliary indicator is actuated by movement of the main indicator.

Referring now to the drawing by characters of reference, 10 denotes the dial having a conventional scale or calibration 12 which I term the main calibration and which in the instance shown is graduated in degrees Fahrenheit. Beneath the main figure scale 12 is an auxiliary calibration 14, which in the embodiment illustrated simulates a thermometer and is graduated between 200 and 212° F. A vane 16 has an upper curved edge 16ᵃ in the shape of a meniscus. Vane 16 is fulcrumed at 18 and in the embodiment shown is provided with a pin or abutment 20 at its extremity so as to contact with the pointer 22 of the main scale, pin 20 travelling in a slot 24 in the dial plate 10.

Figure 2 illustrates diagrammatically the actuating mechanism for the main indicator and shows conventionally a Bourdon tube 26, to which is connected the usual cable 28 carrying the fluid for the actuation of the tube. Movement of the unanchored inner end of the Bourdon tube turns a shaft 30 to which is attached the pointer 22. A plate 32 is provided so as to give a background to the opening within the scale 14.

My invention finds particular application with reference to indicators for motor temperature. In such instruments of the dial type which are mounted on the dash of the vehicle, the temperature responsive portion is as a rule mounted so as to be in contact with the cooling liquid. In such case there is no sudden rise from the normal operating temperature (which may be as high as 190 or 200° F.) up to that of boiling, as in the case when the thermometer bulb is mounted in the air space in the radiator above the cooling liquid in which position it is several degrees below the temperature of the cooling liquid until the latter reaches that of boiling whereupon the indicating liquid takes a quick rise due to the contact of the vapor with it. By the arrangement described, however, the exaggerated movement of the vane 16 as the danger point is approached gives a clear and conspicuous warning of dangerous operating conditions.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

What I claim is:

1. In an indicating device, a main calibration, a main indicator therefor, an auxiliary calibration repeating on a magnified scale a portion only of the main calibration, an auxiliary indicator for said calibration last mentioned, and means for moving said auxiliary indicator to give a magnified movement of said main indicator when the latter traverses said portion of the main calibration.

2. In an indicating device, a main calibration, a main indicator therefor, an auxiliary calibration repeating on a magnified scale a portion of the main calibration, an auxiliary indicator for said calibration last mentioned, and means for moving said auxiliary indicator to give a magnified movement of said main indicator when the latter traverses said portion of the main calibration, said means last mentioned being actuated by said main indicator.

3. In an indicating device, a main calibration, a main indicator therefor, an auxiliary indicator whose movement repeats on a magnified scale a portion of the movement of the main indicator, and means for moving said auxiliary indicator to give a magnified movement of said main indicator when the latter travels said portion of its movement, said means last mentioned being actuated by said main indicator and comprising a lever, a fulcrum therefor and a stop carried by said lever and engaging said main indicator.

4. In a device for indicating motor temperatures, a main calibration, a main indicator therefor, an auxiliary calibration simulating a thermometer, and repeating on an enlarged scale a portion of the main indicator, an auxiliary indicator for said calibration last mentioned comprising a pivoted member, means for moving said auxiliary indicator to give a magnified movement of said main indicator when the latter traverses said portion of the main calibration comprising an abutment on said member, the latter being arranged so as to be moved by the main indicator.

5. In an indicating device, a main indicator, a calibration therefor, an auxiliary indicator whose movement is adapted to repeat on a magnified scale the corresponding movement of the main indicator for a portion only of the travel of said main indicator, and means for actuating said auxiliary indicator during said portion of the travel of said main indicator.

6. In an indicating device, a main indicator, a calibration therefor, an auxiliary indicator whose movement is adapted to repeat on a magnified scale the corresponding movement of the main indicator for a portion only of the travel of said main indicator, and means for actuating said auxiliary indicator during said portion of the travel of said main indicator, said means last mentioned being actuated by said main indicator.

7. In an indicating device, a main calibration, a main indicator therefor, an auxiliary indicator to be actuated during a portion only of the travel of said main indicator, means for moving said auxiliary indicator when the latter travels said portion of its movement, said means last mentioned being actuated by said main indicator, and comprising a pivoted member and a stop carried thereby and engaging said main indicator, said member having its pivot disposed so as to give the indicating portion of said member a magnified movement with respect to the corresponding movement of said main indicator.

8. In an indicating device, a main calibration, a main indicator therefor, an auxiliary indicator to be actuated during a portion only of the travel of said main indicator, means for moving said auxiliary indicator when the latter travels said portion of its movement, said means last mentioned being actuated by said main indicator, and comprising a pivoted member and a stop carried thereby and engaging said main indicator, said member having its pivot disposed so as to give the indicating portion of said member a magnified movement with respect to the corresponding movement of said main indicator, and arranged so as to be returned to its initial position by gravity.

In testimony whereof I have affixed my signature to this specification.

HERMAN SCHLAICH.